United States Patent
Berta

(10) Patent No.: US 6,667,367 B1
(45) Date of Patent: Dec. 23, 2003

(54) DIRECTLY PAINTABLE POLYPROPYLENE GRAFT COPOLYMERS

(75) Inventor: Dominic A. Berta, Newark, DE (US)

(73) Assignee: Basell Poliolefine Italia S.p.A., Milan (IT)

( * ) Notice: Subject to any disclaimer, the term of this patent is extended or adjusted under 35 U.S.C. 154(b) by 0 days.

(21) Appl. No.: 09/680,521

(22) Filed: Oct. 10, 2000

(51) Int. Cl.⁷ ............................................... C08F 255/00
(52) U.S. Cl. .............................. 525/63; 525/64; 525/65; 525/66; 525/69; 525/71; 525/191; 525/206
(58) Field of Search ................................. 525/191, 206, 525/71, 63, 64, 65, 66, 69

(56) References Cited

U.S. PATENT DOCUMENTS

| | | | |
|---|---|---|---|
| 4,735,988 A | 4/1988 | Takada et al. .............. | 524/504 |
| 5,140,074 A | 8/1992 | DeNicola, Jr. et al. ..... | 525/263 |
| 5,212,246 A | 5/1993 | Ogale ......................... | 525/240 |
| 5,286,791 A | 2/1994 | DeNicola, Jr. et al. ....... | 525/71 |
| 5,302,454 A | 4/1994 | Cecchin et al. ............. | 428/402 |
| 5,409,992 A | 4/1995 | Eppert, Jr. .................... | 525/88 |
| 5,411,994 A | 5/1995 | Galli et al. ................. | 521/50.5 |
| 5,548,013 A | 8/1996 | Fujii et al. .................. | 524/449 |
| 5,883,188 A | 3/1999 | Hwang et al. ................. | 525/71 |
| 5,889,100 A | 3/1999 | Asai et al. .................. | 524/451 |
| 5,959,015 A | 9/1999 | Helms et al. ................ | 524/394 |
| 5,959,030 A | 9/1999 | Berta .......................... | 525/64 |
| 5,962,573 A | 10/1999 | Berta .......................... | 524/487 |
| 6,166,132 A | 12/2000 | Berta .......................... | 525/64 |

FOREIGN PATENT DOCUMENTS

| | | |
|---|---|---|
| EP | 934975 | 8/1999 |
| EP | 936246 | 8/1999 |
| WO | 9425525 | 11/1994 |
| WO | 0036012 | 6/2000 |

*Primary Examiner*—Jeffrey C. Mullis

(57) ABSTRACT

A directly paintable polyolefin composition contains (1) a graft copolymer, composition containing (a) a graft copolymer having a backbone of propylene polymer material having graft polymerized thereto at least one vinyl monomer capable of being polymerized by free radicals, (b) a rubber component, and, optionally, (c) a broad molecular weight distribution propylene polymer material, (2) an oxidized polyethylene wax, (3) a propylene-homopolymer or copolymer grafted with an anhydride of an aliphatic α,β-unsaturated dicarboxylic acid, (4) a functionalized polymer that is reactive with the anhydride groups of the grafted polymers, (5) optionally, a polyolefin rubber grafted with an anhydride of an aliphatic α,β-unsaturated dicarboxylic acid, and (6) optionally, an ethylene polymer grafted with an anhydride of an aliphatic α,β-unsaturated dicarboxylic acid. The compositions are particularly useful for making injection molded automobile parts and exhibit excellent paint adhesion and durability.

6 Claims, No Drawings

DIRECTLY PAINTABLE POLYPROPYLENE GRAFT COPOLYMERS

FIELD OF THE INVENTION

This invention relates to compositions containing, propylene polymer materials grafted with polymerized vinyl monomers.

BACKGROUND OF THE INVENTION

Polyolefins are not paintable or coatable because the paints or coatings consist of polar materials like urethanes, acrylics, epoxies, or melamines that have very poor adhesion to nonpolar materials like polyolefins. Typically an adhesion promoter is used as the tie layer between the polyolefin substrate and the paint coating. This extra step adds to the cost of the product, and the coating is not very durable. Grafting the polyolefin with somewhat more polar materials such as vinyl-substituted aromatic compounds, or unsaturated aliphatic acids does not render the surface of molded parts polar enough to make paint adhere to the surface.

Various additives have been proposed for making thermoplastic olefins directly paintable. Thermoplastic olefins are uncrosslinked blends of olefin polymers and polyolefin elastomers. For example, U.S. Pat. No. 5,959,030 discloses a directly paintable thermoplastic olefin (TPO) composition containing, in addition to the TPO, (1) a low molecular weight maleic anhydride-grafted propylene homopolymer or ethylene/propylene random copolymer, (2) a maleic anhydride-grafted olefin polymer material, and (3) a functionalized polymer that is reactive with the anhydride groups of the grafted polymers. U.S. Pat. No. 5,962,573 discloses a directly paintable TPO composition containing, in addition to the TPO, (1) an oxidized polyethylene wax, (2) a propylene homopolymer or copolymer grafted with an anhydride of an aliphatic α,β-unsaturated dicarboxylic acid, (3) a functionalized polymer that is reactive with the anhydride groups of the grafted polymers, optionally (4) a polyolefin rubber grafted with an anhydride of an aliphatic α,β-unsaturated dicarboxylic acid, and optionally (5) a low molecular weight ethylene polymer grafted with an anhydride of an aliphatic α,β-unsaturated dicarboxylic acid.

However, there is still a need for polypropylene graft copolymer compositions that can meet-the more stringent requirements for paint adhesion and durability that are required in today's marketplace, particularly in the automotive industry.

SUMMARY OF THE INVENTION

The composition of this invention comprises, by weight, (1) 100 parts of a graft copolymer composition comprising (a) a graft copolymer comprising a backbone of a propylene polymer material having graft polymerized thereto at least one vinyl monomer capable of being polymerized by free radicals, (b) at least 5% of a rubber component, based on the total weight of the graft copolymer composition, and, optionally, (c) about 5% to about 40% of abroad molecular weight distribution propylene polymer material, based on the total weight of the graft copolymer composition;

(2) about 5 to about 20 parts per hundred parts of the graft copolymer composition. of an oxidized polyethylene wax having a melting point of less than 116° C. and an acid number-of less than 40;

(3) about 5 parts to about 20 parts per hundred parts oft he graft copolymer composition of a propylene homopolymer or a propylene copolymer with ethylene or a 4–8 C alpha-olefin having an ethylene or alpha-olefin content of about 0.5% to about 20%, grafted with an anhydride of an aliphatic α,β-unsaturated dicarboxylic acid and having an anhydride content of about 2 to about 5%;

(4) a functionalized polymer that is reactive with the anhydride groups of the grafted polymers, selected from the group consisting of:
   (a) about 2 to about 6 parts per hundred parts of the graft copolymer composition of an amine-terminated polyalkylene glycol;
   (b) about 2 to about 6 parts per hundred parts of the graft copolymer composition of a hydroxy-terminated polyolefin;
   (c) about 2 to about 6 parts per hundred parts of the graft copolymer composition of a hydroxy-terminated polybutadiene;
   (d) about 2 to about 8 parts per hundred parts of the graft copolymer composition of a hydroxy-terminated olefin/alkylene oxide copolymer;
   (e) about 2 to about 8 parts per hundred parts of the graft copolymer composition of a hydroxy-terminated polyalkylene oxide;
   (f) about 2 to about 8 parts per hundred parts of the graft copolymer composition of a methoxy-terminated polyalkylene oxide;
   (g) about 2 to about 8 parts per hundred parts of the graft copolymer composition of an amine-terminated olefin/alkylene oxide copolymer, and
   (h) mixtures thereof;

(5) optionally, about 4 to about 30 parts per hundred parts of the graft copolymer composition of a polyolefin rubber grafted with an anhydride of an aliphatic α,β-unsaturated dicarboxylic acid, having an anhydride content of at least 0.3% but less than 3% and comprising a polymer of ethylene and a 3–8 C alpha-olefin, optionally containing about 0.5% to about 10% of a diene, having an ethylene content of about 30% to about 70%, with the exception that when the amount of (2)+(3) is equal to or greater than 25 parts per hundred parts of the graft copolymer composition, (5) must be present, and (6) optionally, about 5 to about 20 parts per hundred parts of the graft copolymer composition of an ethylene polymer grafted with an anhydride of an aliphatic α,β-unsaturated dicarboxylic acid, having an anhydride content of about 1% to. about 16% and a number average molecular weight $M_n$ of about 500 to about 5000.

Injection molded parts such as automobile bumpers made from this composition are directly paintable with polar paints or coatings without the need for a layer of adhesion promoter between the graft copolymer composition and the paint, and exhibit excellent paint adhesion and durability.

DETAILED DESCRIPTION OF THE INVENTION

Component (1) of the composition of this invention is a graft copolymer composition comprising (a) a graft copolymer comprising a backbone of a propylene polymer material having graft polymerized thereto at least one vinyl monomer capable of being polymerized by free radicals, (b) a rubber component, and, optionally, (c) a broad molecular weight distribution propylene polymer material.

The propylene polymer material that is used as the backbone of the graft copolymer can be:

(1) a crystalline homopolymer of propylene having an isotactic index greater than 80, preferably about 85 to about 99;
(2) a crystalline copolymer of propylene and an olefin selected from the group consisting of ethylene and 4–10 C alpha-olefins, provided that when the olefin is ethylene, the maximum polymerized ethylene content is about 10%, preferably about 4%, and when the olefin is a 4–10 C alpha-olefin, the maximum polymerized content thereof is about 20% by weight, preferably about 16%, the copolymer having an isotactic index greater than 85;
(3) a crystalline terpolymer of propylene and two olefins selected from the group consisting of ethylene and 4–8 C alpha-olefins, provided that the maximum polymerized 4–8 C alpha-olefin content is 20% by weight, preferably about 16%, and, when ethylene is one of the olefins, the maximum polymerized ethylene content is 5% by weight, preferably about 4%, the terpolymer having an isotactic index greater than 85;
(4) an olefin polymer composition comprising:
  (a) about 10% to about 60% by weight, preferably about 15% to about 55%, of a crystalline propylene homopolymer having an isotactic index greater than 80, preferably about 85 to about 98, or a crystalline copolymer of monomers selected from the group consisting of (i) propylene and ethylene, (ii) propylene, ethylene and a 4–8 C alpha-olefin, and (iii) propylene and a 4–8 C alpha-olefin, the copolymer having a polymerized propylene content of more than 85% by weight, preferably about 90% to about 99%, and an isotactic index greater than 85;
  (b) about 5% to about 25% by weight, preferably about 5% to about 20%, of a copolymer of ethylene and propylene or a, 4–8 C alpha-olefin that is insoluble in xylene at ambient temperature; and
  (c) about 30% to about 70-by weight, preferably about 40% to about 65%, of an elastomeric copolymer of monomers selected from the group consisting of (i) ethylene and propylene, (ii) ethylene, propylene, and a 4–8 C alpha-olefin, and (iii) ethylene and a 4–8 C alpha-olefin, the copolymer optionally containing about 0.5% to about 10% by weight of a polymerized diene and containing less than 70% by weight, preferably about 10% to about 60%, most preferably about 12% to about 55%, of polymerized ethylene and being soluble in xylene at ambient temperature and having an intrinsic viscosity, measured in decahydronaphthalene at 135° C., of about 1.5 to about. 4.0 dl/g,
    wherein the total amount of (b) and (c), based on the total olefin polymer composition, is about 50%4 to about 90%, the weight ratio of (b)/(c) is less than 0.4, preferably 0.1 to 0.3, and the composition is prepared by polymerization in at least two stages and has a flexural modulus of less than 150 MPa; or
(5) a thermoplastic olefin comprising:
  (a) about 10% to about 60%, preferably about 20% to about 50%, of a propylene homopolymer having an isotactic index greater than 80, or a copolymer of monomers selected from the group consisting of (i) ethylene and propylene, (ii) ethylene, propylene and a 4–8 C alpha-olefin, and (iii) ethylene and a 4–8 C alpha-olefin, the copolymer having a polymerized propylene content greater than 85% and an isotactic index of greater than 85;
  (b) about 20% to about 60%, preferably about 30% to about 50%, of an amorphous copolymer of monomers selected from the group consisting of (i) ethylene and propylene, (ii) ethylene, propylene, and a 4–8 C alpha-olefin, and (iii) ethylene and a 4–8 C alpha-olefin, the copolymer optionally containing about 0.5% to about 10% of a polymerized diene, and containing less than 70% polymerized ethylene and being soluble in xylene at ambient temperature; and
  (c) about 3% to about 40%, preferably about 10% to about 2%, of a copolymer of ethylene and propylene or a 4–8 C alpha-olefin that is insoluble in xylene at ambient temperature,
    wherein the thermoplastic olefin has a flexural modulus of greater than 150 but less than 1200 MPa, preferably about 200 to about 1100 MPa, and most preferably about 200 to about 1000 NPa. Room or ambient temperature is ~25° C.

The 4–8 C alpha-olefins useful in the preparation of (4) and (5) include, for example, butene-1, pentene-1; hexene-1; 4-methyl-1-pentene, and octene-1.

The diene, when present, is typically a butadiene; 1,4-hexadiene; 1,5-hexadiene, or ethylidenenorbornene.

Propylene polymer materials (4) and (5) can be prepared by polymerization in at least two stages, where in the first stage the propylene; propylene and ethylene; propylene and an alpha-olefin, or propylene, ethylene and an alpha-olefin are polymerized to form component (a) of (4) or (5), and in the following stages the mixtures of ethylene and propylene; ethylene and the alpha-olefin, or ethylene, propylene and the alpha-olefin, and optionally a diene, are polymerized to form components (b) and (c) of (4) or (5).

The polymerization can be conducted in liquid phase, gas phase, or liquid-gas phase using separate reactors, all of which can be done either by batch or continuously. For example, it is possible to carry out the polymerization of component (a) using liquid propylene as a diluent, and the polymerization of components (b) and (c) in gas phase, without intermediate stages except for the partial degassing of the propylene. All gas phase is the preferred method.

The preparation of propylene polymer material (4) is described in more detail in U.S. Pat. Nos. 5,212,246 and 5,409,992, which are incorporated herein by reference. The preparation of propylene polymer material (5) is described in more detail in U.S. Pat. Nos. 5,302,454 and 5,409,992, which are incorporated herein by reference.

Propylene homopolymer is the preferred propylene polymer backbone material.

The monomers that can be grafted onto the backbone of propylene polymer material include any monomeric vinyl compound capable of being polymerized by free radicals, wherein the vinyl radical $H_2C=CR-$, in which R=H or methyl, is attached to a straight or branched aliphatic chain or to a substituted or unsubstituted aromatic, heterocyclic, or alicyclic ring in a mono- or polycyclic compound. Typical substituent groups can be alkyl, hydroxyalkyl, aryl, and halo. Usually the vinyl monomer will be a member of one of the following classes: (1) vinyl-substituted aromatic, heterocyclic, or alicyclic compounds, including styrene, vinylnaphthalene, vinylpyridine, vinylpyrrolidone, vinylcarbazole, and homologs thereof, e.g., alpha- and para-methylstyrene, methylchlorostyrene, p-tert-butylstyrene, methylvinylpyridine, and ethylvinylpyridine, and (2) unsaturated aliphatic nitriles and carboxylic acids and their esters including acrylonitrile; methacrylonitrile; acrylic acid; acrylate esters such as the methyl, ethyl, hydroxyethyl, 2-ethylhexyl, and butyl acrylate esters; methacrylic acid; methacrylate esters, such as the methyl, ethyl, butyl, benzyl, phenylethyl, phenoxyethyl, epoxypropyl, and hydroxypropyl methacrylate esters. Multiple monomers from the same or different classes can be employed.

The polymerized monomers comprise about 5 to about 240 parts per hundred parts of the propylene polymer material, preferably about 20 to about 100 parts.

During the graft polymerization, the monomers also copolymerize to form a certain amount of free or ungrafted. copolymer. Any reference to "polymerized monomers" in this specification is meant to include both grafted and ungrafted polymerized monomers. The morphology of the graft copolymer is such that the propylene polymer material is the continuous or matrix phase, and the polymerized monomers, both grafted and ungrafted, are a dispersed phase.

The graft copolymer can be made according to any one of various methods. One of these methods involves forming active grafting sites on the propylene polymer material by treatment with a peroxide or other chemical compound that is a free radical polymerization initiator, or by irradiation with high energy ionizing radiation. The free radicals produced on the polymer as a result of the chemical or irradiation treatment form the active grafting sites on the polymer and initiate the polymerization of the monomers at these sites. Graft copolymers produced by peroxide-initiated grafting methods are preferred.

Preparation of graft copolymers by contacting the polypropylene with a free radical polymerization initiator such as an organic peroxide, and at least one vinyl monomer is described in more detail in U.S. Pat. No. 5,140,074, which is incorporated herein by reference. Preparation of graft copolymers by irradiating an olefin polymer and then treating with at least one vinyl monomer is described in more detail in U.S. Pat. No. 5,411,994, which is incorporated herein by reference.

The rubber component (b) of the graft copolymer composition is selected. from one or more of the group. consisting of (i) an olefin copolymer rubber, (ii) a monoalkenyl aromatic hydrocarbon-conjugated diene block copolymer, and (iii) a core-shell rubber. Any of these rubber components can have acid or anhydride functionality or can be free of these functional groups. The preferred rubber components are (i) or (ii), either alone or in combination.

Suitable olefin copolymer rubbers include, for example, saturated olefin copolymer rubbers such as ethylene/propylene monomer rubbers (EPM), ethylene/octene-1, and ethylene/butene-1 rubbers, and unsaturated olefin copolymer rubbers such as ethylene/propylene/diene monomer rubbers (EPDM). The preferred olefin copolymer rubbers are ethylene/propylene, ethylene/butene-1, and ethylene/octene-1 copolymers.

The monoalkenyl aromatic hydrocarbon-conjugated diene block copolymer can be a thermoplastic elastomer of the A-B (or diblock) structure, the linear A-B-A (or triblock) structure, the radial (A-B)$_n$ type where n=3–20%, or a combination of these structure types, wherein each A block is a monoalkenyl aromatic hydrocarbon polymer block, and each B block is an unsaturated rubber block. Various grades of copolymers of this type are commercially available. The grades differ in structure, molecular weight of the mid and end blocks, and the ratio of monoalkenyl aromatic hydrocarbon to rubber. The block copolymer can also be hydrogenated. Typical monoalkenyl aromatic hydrocarbon monomers are styrene, ring-substituted 1–4 C linear or branched alkyl styrenes, and vinyltoluene. Styrene is preferred. Suitable conjugated dienes include, for example, butadiene and isoprene. Preferred block copolymers are hydrogenated styrene/ethylene-propylene/styrene triblock copolymers.

The weight average molecular weight ($M_w$) of the block copolymers generally will be in the range of about 45,000 to about 260,000 g/mole, average molecular weights in the range of about 50,000 to about 125,000 g/mole being preferred on the basis that they produce compositions having the best balance of impact strength and stiffness. Also, while block copolymers having unsaturated as well as saturated rubber blocks can be used, copolymers having saturated rubber blocks are preferred, also on the basis of the impact/stiffness balance of the compositions containing them. The weight ratio of monoalkenyl aromatic hydrocarbon to conjugated diene rubber in the block copolymer is in the range of about 5/95 to about 50/50, preferably about 10/90 to about 40/60.

The core-shell rubber components comprise small particles of a crosslinked rubber phase surrounded by a compatibilizing shell, normally a glassy polymer or copolymer. The core is typically a diene rubber such as butadiene or isoprene rubber, or a polyacrylate. The shell is typically a polymer of two or more monomers selected from styrene, methyl methacrylate, and acrylonitrile. Particularly preferred core-shell rubbers have a polyacrylate core.

Suitable impact modifiers include, for example, Engage 8150 or Engage 8200 ethylene/octene-1 copolymers commercially available from DuPont-Dow Elastomers; EPM 306P ethylene/propylene copolymer, commercially available from the Polysar Rubber Division of Miles, Incorporated; and Kraton RP6912 styrene/ethylene-propylene/styrene triblock copolymer rubber and Kraton FG1901X styrene/ethylene-butene-1/styrene triblock copolymer rubber modified with maleic anhydride, commercially available from Shell Chemical Company.

The rubber component is present in an amount of at least 5% by weight, based on the total weight of the graft copolymer composition.

Optional component (c) of the graft copolymer composition is a broad molecular weight distribution propylene polymer material (BMWD PP) having a $M_w/M_n$ of about 5 to about 60, preferably about 5 to about 40; a melt flow rate of about 0.5 to about 50, preferably about 1 to about 30 g/10 min, and xylene insolubles at 25° C. of greater than or equal to 94%, preferably greater than or equal to 96%, and most preferably greater than or equal to 98%. The propylene polymer material having a broad molecular weight distribution can be a homopolymer of propylene or an ethylene/propylene rubber impact-modified homopolymer of propylene, wherein the propylene homopolymer has a broad molecular weight distribution.

The BMWD PP can be prepared by sequential polymerization in at least two stages, in the presence of a Ziegler-Natta catalyst supported on magnesium halide in active form. The polymerization process occurs in separate and consecutive stages, and in each stage polymerization takes place in the. presence of the polymer and the catalyst from the preceding stage.

The polymerization process can be carried out in a batch or in a continuous mode according to known techniques, operating in liquid phase in the presence or not of an inert diluent, or in gas phase, or liquid-gas phase, preferably in gas phase. The preparation of the BMWD PP is described in more detail in U.S. Pat. No. 5,286,791, which is incorporated herein by reference.

When present, optional component (c) of the graft copolymer composition is used in an amount of about 5% to about 40%, preferably about 10% to about 25%, based on the total weight of the graft copolymer composition.

Component (2) of the composition of this invention is an oxidized polyethylene wax having a melting point of less than 116° C. and an acid number of less than 40. The oxidized wax is present in an amount of about. 5 to about 20 parts, preferably about 5 to about 15 parts, most preferably about 5 to about 10 parts, per hundred parts of the graft copolymer composition, whether or not optional component (5), the maleic anhydride-grafted rubber, is present.

Component (3) of the composition of this invention is a propylene homopolymer or a propylene copolymer with ethylene or a 4–8 C alpha-olefin, grafted with an anhydride of an aliphatic α,β-unsaturated dicarboxylic acid and having an ethylene or alpha-olefin content of about 0.5% to about 20%, preferably about 1% to about 10%, and most preferably about 1% to about 5%. Propylene homopolymer is preferred. The polymer has an anhydride content of about 2% to about 5%, preferably about 3% to about 4%, and preferably has a number average molecular weight $M_n$ of about 2500 to about 25,000, most preferably about 3000 to about 10,000. Maleic anhydride is the preferred anhydride. Component (3) is present in an amount of about 5 to about 20 parts, preferably about 8 parts to about 16 parts, most preferably about 10 to about 14 parts, per hundred parts of the graft copolymer composition.

Component (4) of the composition of this invention is a functionalized polymer that is reactive with the anhydride groups of the grafted polymers (3) and, when present, (5) and/or (6), selected from the group consisting of (a) an amine-terminated polyalkylene glycol, (b) a hydroxy-terminated polyolefin, (c) a hydroxy-terminated polybutadiene, (d) hydroxy-terminated olefin/alkylene oxide copolymers, (e) hydroxy-terminated polyalkylene oxides, (f) methoxy-terminated polyalkylene oxides, (g) amine-terminated olefin/alkylene oxide copolymers, and (h) mixtures thereof.

Component (4)(a), when present, is used in an amount of about 2 to about 6 parts, preferably about 2 to about 4 parts, per hundred parts of the graft copolymer composition. The polyalkylene glycol can be, for example, polyethylene glycol, polypropylene glycol, copolymers of ethylene glycol and propylene glycol, poly(1,2-butylene glycol), and poly (tetramethylene glycol).

Component (4)(b), when present, is used in an amount of about 2 to about 6 parts, preferably about 2 to about 4 parts, per hundred parts of the graft copolymer composition. Polyethylene is the preferred polyolefin, although polypropylene, polybutene, and copolymers of ethylene and another alpha-olefin can also be used.

Component (4)(c), when present, is used in an amount of about 2 to about 6 parts, preferably about 2 to about 4 parts, per hundred parts of the graft copolymer composition. The polybutadiene used to make the hydroxy-terminated additive can be 1,2- or 1,4-polybutadiene or a combination of the two. The 1,2-vinyl content is at least 50%, preferably 50% to 90%, and most preferably 70% to 90%.

Component (4)(d), when present, is used in an amount of about 2 to about 8 parts, preferably about 2 to about 6 parts, per hundred parts of the graft copolymer composition. An ethylene/ethylene oxide copolymer is preferred, although other copolymers such as ethylene/propylene oxide, propylene/ethylene oxide, butene/ethylene oxide, and butene/propylene oxide copolymers can also be used. The amount of alkylene oxide can be from about 10% to about 99.9%, preferably about 50% to about 98%, and most preferably about 75% to about 95%, based on 100% of the copolymer.

Component (4)(e), when present, is used in an amount of about 2 to about 8 parts, preferably about 2 to about 6 parts, per hundred parts of the graft copolymer composition. Polyethylene glycol is preferred, however, polypropylene glycol, copolymers of ethylene glycol and propylene glycol, poly(1,2-butylene glycol), and poly(tetramethylene glycol) can also be used.

Component (4)(f), when present, is used in an amount of about 2 to about 8 parts, preferably about 2 to about 6 parts, per hundred parts of the graft copolymer composition. Suitable polyalkylene oxides are those described under (4)(e).

Component (4)(g), when present, is used in an amount of about 2 parts to about 8 parts, preferably about 2 to about 6 parts, per hundred parts of the graft copolymer composition. The amount of alkylene oxide can be about 10% to about 99.9%, preferably about 50% to about 98%, and most preferably about 75% to about 95%. Examples of suitable olefin/alkylene oxide co polymers are described under (4) (d).

When using a combination of functionalized polymers, the amount of each component can vary widely from about 0.1% to about 99.9% of each, based on the total amount of functionalized polymers. It is preferred that one component be present in an amount of >50%, preferably >60%, based on the total amount of functionalized polymers.

Instead of adding the functionalized polymer directly to the graft copolymer composition, an adduct of the functionalized polymer and the anhydride-grafted propylene homopolymer or ethylene/propylene copolymer can be prepared separately, then blended with the graft copolymer composition.

Optional component (5) of the composition of this invention is a polyolefin rubber grafted with an anhydride of an aliphatic α,β-unsaturated dicarboxylic acid and comprising a polymer of ethylene and a 3–8 C alpha-olefin, optionally containing about 0.5% to about 10% of a diene, preferably about 2% to about 6%. The anhydride-grafted polyolefin rubber has an ethylene content of about 30% to about 70%, preferably about 40% to about 60%, and has an anhydride content of at least 0.3% but less than 3%. Maleic anhydride is the preferred anhydride. When present, the anhydride-grafted rubber is used in an amount of about 4 to about 30 parts, preferably about 5 to. about 15 parts, most preferably about 5 to about 12 parts, per hundred parts of the graft copolymer composition, with the exception that when the amount of component (2)+component (3) is >25 parts per hundred parts of the graft copolymer composition, component (5) must be present.

Optional component (6) of the composition of this invention is an ethylene polymer grafted with an anhydride of an aliphatic α,β-unsaturated dicarboxylic acid and having an anhydride content of about 1% to about 16% by weight, preferably about 2% to about 13%, most preferably about 3% to about 13%. Maleic anhydride is the preferred anhydride. Ethylene homopolymer is preferred. However, copolymers containing 10% or less of an alpha-olefin comonomer can also be used. The ethylene polymer preferably has a $M_n$ of about 500 to about 5000, preferably about 600 to about 2000, most preferably about 600 to about 1000. When component (6) is used, it is present in an amount of about 5 to about 20 parts, preferably about 5 to about 10 parts, per hundred parts of the graft copolymer composition.

Other additives such as pigments, slip agents, oils, antiblocking agents, conductive and non-conductive carbon black, inorganic fillers such as $CaCO_3$ and talc, and antioxidants can also be present.

The compounding or melt blending of the components of the composition can be carried out on an open roll, in an internal mixer (Banbury or Haake mixers), or in single screw or twin screw extruders.

The compositions of this invention can be formed in any way, such as, for example, by extrusion, compression molding, and thermoforming. Injection molding is preferred. They can also be co-extruded or co-injection molded with other polyolefin materials such as propylene homopolymers, copolymers, and other graft copolymers; ethylene homopolymers and copolymers, or thermoplastic olefins.

In order to create a more severe test for paint adhesion, the specimens for testing were prepared using a pin-gated mold rather than the fan-gated mold typically used for molding thermoplastic olefins. Durability depends upon the paint thickness—the thicker the paint or film, the better the durability. In the following examples and comparative examples only one coat of paint was used with an approximately 1.2 mil film thickness, which is a very severe test. A typical durability test used in the automotive industry also employs atop coat that has a low coefficient of friction, which reduces the severity of the test. No top coat was used in the following examples and comparative examples.

The samples for testing were prepared by dry blending the ingredients and reactive mixing in a twin screw extruder at a temperature of 450° F. and pelletizing the resultant material. The pellets were injection molded into disks that were painted with about a 1.2 to 2 mil thick coating using DuPont 872 white paint and cured at 250° F. for thirty minutes. A lattice pattern of squares with each square about ¼ inch in size was scribed on the painted disk at the end opposite the gate area of the disk. Adhesive tape (3M 898) was pressed onto the paint and pulled off to test the amount of paint removed or the paint adhesion. The % failure was recorded as the % of the squares removed by the tape after successive pulls.

The durability was determined by using a Taber abrader with a type C scuffing head assembly and a one pound load. The painted disk was placed in an oven at 70° C. for one hour, removed and placed on the platform of the abrader. The scuffing head was placed in contact with the painted surface and the disk was rotated for a specified number of cycles. The amount of paint removed from the complete circumference subtended by the scuffimg head was recorded as the % failure.

The criteria set for acceptable paint adhesion were <25% failure at the gate and <10% failure opposite the gate on the first pull; for 5 pulls, <60% failure at the gate and <40% opposite the gate. The criteria for satisfactory durability was <30% failure after 100 cycles.

Isotactic index is defined as the % of the polymer insoluble in xylene. The weight percent of polymer soluble in xylene at room temperature is determined by dissolving 2.5 g of the polymer in 250 ml of xylene at room temperature in a vessel equipped with a stirrer, that is heated at 135° C. with agitation for 20 minutes. The solution is cooled to 25° C. while continuing the agitation, and then left to stand without agitation for 30 minutes so that the solids can settle. The solids are filtered with filter paper, the remaining solution is evaporated by treating it with a nitrogen stream, and the solid residue is vacuum dried at 80° C. until a constant weight is reached. The percent by weight of polymer insoluble in xylene at room temperature is the isotactic index of the polymer. The value obtained in this manner corresponds substantially to the isotactic index determined via extraction with boiling n-heptane, which by definition constitutes the isotactic index of the polymer.

Intrinsic viscosity is measured in decahydronaphthalene at 135° C.

Polydispersity index (PI) is defined as the inverse of the cross-over modulus obtained from a frequency scan as described in G. R. Zeichner and P. D. Patel, "A Comprehensive Evaluation of Polypropylene Melt Rheology", Proc. $2^{nd}$ World Cong. On Chem. Eng., Vol. 6, p. 333, Montreal, 1981.

Weight average and number average molecular weight are determined by gel permeation chromatography.

Melt flow rate (MFR) is measured at 230° C. and 2.16 kg.

In this specification, all parts and percentages are by weight unless otherwise noted.

Example 1

This example shows the paint adhesion and durability of a composition of this invention compared to the graft copolymer composition alone. The graft copolymer was made from a propylene homopolymer to which was grafted polystyrene.

The propylene homopolymer used as the backbone of the graft copolymer had an average melt flow rate of 9 g/10 min and a poured bulk density of 0.340–0.345, and is commercially available from Montell USA Inc.

The monomers were grafted onto the propylene homopolymer backbone at a grafting temperature of 120° C. using the previously described peroxide-initiated graft polymerization process. Forty-five parts by weight of styrene were added per 100 parts of polypropylene. Lupersol PMS 50% t-butylperoxy-2-ethyl hexanoate in mineral spirits, commercially available from Elf Atochem, was used as the peroxide initiator. The monomer was fed at 0.9 pph/min, and a monomer to initiator molar ratio of 105 was used. After completion of monomer and peroxide addition, the temperature was raised to 140° C. for 60 minutes under a nitrogen purge.

The graft copolymer was blended with a broad molecular weight distribution propylene homopolymer (BMWD PP), a rubber, an antioxidant, and calcium stearate in the-amounts given below. The BMWD PP had a PI of 7.4, a MFR of 1 g/10 min, and xylene solubles at room temperature of 1.5%, and is commercially available from Montell USA Inc.

The rubber was Engage 8150 ethylene/octene copolymer containing 25% octene and is commercially available from DuPont-Dow Elastomers.

The antioxidant was Irganox B-225, a blend of 1 part Irganox 1010 tetrakis[methylene(3,5-di-tert-butyl-4-hydroxyhydrocinnamate)]methane stabilizer and 1 part Irgafos 168 tri(2,4-di-t-butylphenyl)phosphite stabilizer, and is commercially available from Ciba Specialty Chemicals Corporation.

The graft copolymer composition contained the following components:

| | |
|---|---|
| Graft copolymer | 34.85% |
| BMWD PP | 34.85% |
| Rubber | 30.00% |
| Antioxidant | 0.2% |
| Calcium stearate | 0.1% |

The graft copolymer compositions were compounded on a 40 mm co-rotating, intermeshing Werner-Pfleiderer twin screw extruder. Each sample was extruded as pellets.

The samples for testing were prepared as described previously in the description of the test method for measuring paint adhesion.

The results of the paint adhesion test and the durability test are given in Table 1.

In Table 1, the polyolefin rubber grafted with maleic anhydride (MA-g-rubber) was Exxelor VA 1803 ethylene/propylene rubber containing 0.7% grafted maleic anhydride, commercially available from Exxon Chemical Company.

The propylene homopolymer grafted with maleic anhydride (MA-g-PP) was Epolene E-43 maleic anhydride-modified polypropylene wax, commercially available from Eastman Chemical Company.

The oxidized polyethylene wax was Petrolite C-3500 polyethylene (PE) wax having a melting point of 96° C. and an acid number of 24, and is commercially available from Baker Petrolite Corporation.

The functionalized polymer was Unithox 480 hydroxy-terminated ethylene/ethylene oxide copolymer having a molecular weight $M_n$ of 2250 and a hydroxyl number of 22, commercially available from Baker Petrolite Corporation.

The antioxidant was Irganox B 225, a blend of 1 part Irganox 1010 tetrakis[methylene(3,5-di-tert-butyl-4-hydroxyhydrocinnamate)methane and 1 part Irgafos 168 tris(2,4-di-tert-butylphenyl) phosphite antioxidant, commercially available from Ciba Specialty Chemicals Company.

The designation "gt/op" stands for "at the gate/opposite the gate" of the mold used to prepare the samples for testing. The control containing only the graft copolymer composition with no additives exhibited 100% failure in less than 25 cycles.

Table 1

| Sample | Control 1 | 1 | 2 |
|---|---|---|---|
| Graft copolymer composition | 100 | 100 | 100 |
| MA-g-rubber | — | — | 10 |
| MA-g-PP | — | 15 | 15 |
| Oxidized PE wax | — | 5 | 5 |
| Functionalized polymer | — | 2 | 2 |
| Antioxidant | — | 0.2 | 0.2 |
| Paint Adhesion (% Failure) | gt/op | gt/op | gt/op |
| 1st Pull | 100/100 | 0/0 | 0/0 |
| 3rd Pull | — | 12/0 | 0/0 |
| 5th Pull | — | 30/8 | 0/0 |
| Durability (% failure) | | | |
| 50 Cycles | — | 0 | 0 |
| 100 Cycles | — | 0 | 0 |

COMPARATIVE EXAMPLE 1

All of the components of the compositions listed in Table 2 are the same as in Example 1 with the exception that a maleic anhydride-grafted ethylene polymer (MA-g-PE) is present in some samples. The grafted ethylene polymer is Ceramer 67 maleic anhydride-grafted polyethylene having a number average molecular weight of 655, a maleic anhydride content of 3.8%, and a melting point of 97° C., commercially available from Baker Petrolite Corporation.

TABLE 2

| Sample | Control 2 | Control 3 | Control 4 | Control 5 | Control 6 |
|---|---|---|---|---|---|
| Graft copolymer composition | 100 | 100 | 100 | 100 | 100 |
| MA-g-rubber | — | 5 | — | — | — |
| MA-g-PP | 15 | 10 | 10 | 10 | 10 |
| Oxidized PE wax | 15 | — | 5 | 5 | 15 |
| MA-g-PE | — | 5 | — | 10 | 10 |
| Functionalized polymer | 4 | 3 | 4 | 2 | 4 |
| Antioxidant | 0.2 | 0.2 | 0.2 | 0.2 | 0.2 |
| Paint adhesion (% failure) | g/op | g/op | g/op | g/op | g/og |
| 1st Pull | 12/24 | 24/12 | 80/72 | 36/72 | 24/72 |
| 3rd Pull | 42/84 | 36/60 | 100/77 | 95/100 | 75/100 |
| 5th Pull | 90/100 | 72/80 | 100/100 | 100/100 | 100/100 |
| Durability (% Failure) | | | | | |
| 50 Cycles | 0 | 0 | 0 | 0 | 0 |
| 100 Cycles | 0 | 0 | 0 | 0 | 0 |

EXAMPLE 2

All of the components of the compositions are the same as described in Example 1 and Control Example 1.

TABLE 3

| Sample | 3 | 4 | 5 | 6 | 7 | 8 |
|---|---|---|---|---|---|---|
| Graft copolymer composition | 100 | 100 | 100 | 100 | 100 | 100 |
| MA-g-rubber | 5 | 10 | 10 | 15 | 5 | 5 |
| MA-g-PP | 12 | 15 | 10 | 12.5 | 7.5 | 12.5 |
| Oxidized PE wax | 10 | 5 | 15 | 10 | 10 | 10 |
| MA-g-PE | 5 | 10 | — | 5 | 5 | 5 |
| Functionalized polymer | 5 | 2 | 4 | 3 | 3 | 3 |
| Antioxidant | 0.2 | 0.2 | 0.2 | 0.2 | 0.2 | 0.2 |
| Paint Adhesion (% failure) | g/op | g/op | g/op | g/op | g/op | G/op |
| 1st Pull | 0/0 | 0/0 | 0/0 | 0/0 | 6/6 | 0/0 |
| 3rd Pull | 0/0 | 0/0 | 6/24 | 0/0 | 24/18 | 0/0 |
| 5th Pull | 0/12 | 0/0 | 18/36 | 0/0 | 42/24 | 0/0 |
| Durability (% failure) | | | | | | |
| 50 Cycles | 0 | 0 | 0 | 0 | 0 | 0 |
| 100 Cycles | 0 | 0 | 0 | 0 | 0 | 0 |

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be effected without departing from the spirit and scope of the invention as described and claimed.

I claim:

1. A composition comprising, by weight, the following different components,
    (1) 100 parts of a graft copolymer composition comprising (a) a graft copolymer comprising a backbone of a propylene polymer material having graft polymerized thereto at least one vinyl monomer capable of being polymerized by free radicals, (b) at least 5% by weight of a rubber component, based on the total weight of the graft copolymer composition, and, (c) about 5% to about 40% of a broad molecular weight distribution propylene polymer material having a molecular weight distribution of 5 to 60, based on the total weight of the graft copolymer composition;

(2) about 5 to about 20 parts per hundred parts of the graft copolymer composition of an oxidized polyethylene wax having a melting point of less than 116° C. and an acid number of less than 40;

(3) about 5 parts to about 20 parts per hundred parts of the graft copolymer composition of a propylene homopolymer or a propylene copolymer with ethylene or a 4–8 C alpha-olefin having an ethylene or alpha-olefin content of about 0.5% to about 20%, grafted with an anhydride of an aliphatic α,β-unsaturated dicarboxylic acid and having an anhydride content of about 2 to about 5%;

(4) a functionalized polymer that is reactive with the anhydride groups of the grafted polymers, selected from the group consisting of:
  (a) about 2 to about 6 parts per hundred parts of the graft copolymer composition of an amine-terminated polyalkylene glycol;
  (b) about 2 to about 6 parts per hundred parts of the graft copolymer composition of a hydroxy-terminated polyolefin;
  (c) about 2 to about 6 parts per hundred parts of the graft copolymer composition of a hydroxy-terminated polybutadiene;
  (d) about 2 to about 8 parts per hundred parts of the graft copolymer composition of a hydroxy-terminated olefin/alkylene oxide copolymer;
  (e) about 2 to about 8 parts per hundred parts of the graft copolymer composition of a hydroxy-terminated polyalkylene oxide;
  (f) about 2 to about 8 parts per hundred parts of the graft copolymer composition of a methoxy-terminated polyalkylene oxide;
  (g) about 2 to about 8 parts per hundred parts of the graft copolymer composition of an amine-terminated olefin/alkylene oxide copolymer, and
  (h) mixtures thereof;

(5) optionally, about 4 to about 30 parts per hundred parts of the graft copolymer composition of a polyolefin rubber grafted with an anhydride of an aliphatic α,β-unsaturated dicarboxylic acid, having an anhydride content of at least 0.3% but less than 3% and comprising a polymer of ethylene and a 3–8 C alpha-olefin, optionally containing about 0.5% to about 10% of a diene, having an ethylene content of about 30% to about 70%, with the exception that when the amount of (2)+(3) is equal to or greater than 25 parts per hundred parts of the graft copolymer composition, (5) must be present, and (6) optionally, about 5 to about 20 parts per hundred parts of the graft copolymer composition of an ethylene polymer grafted with an anhydride of an aliphatic α,β-unsaturated dicarboxylic acid, having an anhydride content of about 1% to about 16% and a number average molecular weight $M_n$ of about 500 to about 5000.

2. The composition of claim 1 wherein the propylene polymer material is selected from the group consisting of:

(1) a crystalline homopolymer of propylene having an isotactic index greater than 80;

(2) a crystalline copolymer of propylene and an olefin selected from the group consisting of ethylene and 4–10 C alpha-olefins, provided that when the olefin is ethylene, the maximum polymerized ethylene content is about 10%, and when the olefin is a 4–10 C alpha-olefin, the maximum polymerized content thereof is about 20% by weight, the copolymer having an isotactic index greater than 85;

(3) a crystalline terpolymer of propylene and two olefins selected from the group consisting of ethylene and 4–8 C alpha-olefins, provided that the maximum polymerized 4–8 C alpha-olefin content is 20% by weight, and, when ethylene is one of the olefins, the maximum polymerized ethylene content is 5% by weight, the terpolymer having an isotactic index greater than 85;

(4) an olefin polymer composition comprising:
  (a) about 10% to about 60% by weight of a crystalline propylene homopolymer having an isotactic index greater than 80, or a crystalline copolymer of monomers selected from the group consisting of (i) propylene and ethylene, (ii) propylene, ethylene and a 4–8 C alpha-olefin, and (iii) propylene and a 4–8 C alpha-olefin, the copolymer having a polymerized propylene content of more than 85% by weight, and an isotactic index greater than 85;
  (b) about 5% to about 25% by weight of a copolymer of ethylene and propylene or a 4–8 C alpha-olefin that is insoluble in xylene at ambient temperature; and
  (c) about 30% to about 70% by weight of an elastomeric copolymer of monomers selected from the group consisting of (i) ethylene and propylene, (ii) ethylene, propylene, and a 4–8 C alpha-olefin, and (iii) ethylene and a 4–8 C alpha-olefin, the copolymer optionally containing about 0.5% to about 10% by weight of a polymerized diene and containing less than 70% by weight of polymerized ethylene and being soluble in xylene at ambient temperature and having an intrinsic viscosity, measured in decahydronaphthalene at 135° C., of about 1.5 to about 4.0 dl/g,
    wherein the total amount of (b) and (c), based on the total olefin polymer composition, is about 50% to about 90%, the weight ratio of (b)/(c) is less than 0.4, and the composition is prepared by polymerization in at least two stages and has a flexural modulus of less than 150 MPa; and (5) a thermoplastic olefin comprising:
  (a) about 10% to about 60% of a propylene homopolymer having an isotactic index greater than 80, or a copolymer of monomers selected from the group consisting of (i) ethylene and propylene, (ii) ethylene, propylene and a 4–8 C alpha-olefin, and (iii) ethylene and a 4–8 C alpha-olefin, the copolymer having a polymerized propylene content greater than 85% and an isotactic index of greater than 85;
  (b) about 20% to about 60% of an amorphous copolymer of monomers selected from the group consisting of (i) ethylene and propylene, (ii) ethylene, propylene, and a 4–8 C alpha-olefin, and (iii) ethylene and a 4–8 C alpha-olefin, the copolymer option ally containing about 0.5% to about 10% of a polymerized diene, and containing less than 70% polymerized ethylene and being soluble in xylene at ambient temperature; and (c) about 3% to about 40% of a copolymer of ethylene and propylene or a 4–8 C alpha-olefin that is insoluble in xylene at ambient temperature, wherein the thermoplastic olefin has a flexural modulus of greater than 150 but less than 1200 MPa.

3. The composition of claim 2 wherein the propylene polymer material is propylene homopolymer.

4. The composition of claim 1 wherein the graft polymerized monomer is styrene.

5. The composition of claim 1 wherein the anhydride of the aliphatic α,β-unsaturated dicarboxylic acid is maleic anhydride.

6. The composition of claim 1 wherein the functionalized polymer is selected from the group consisting of (a) an amine-terminated polyethylene oxide, (b) a hydroxy-terminated polyethylene oxide, and (c) a hydroxy-terminated ethylene/ethylene oxide copolymer.

* * * * *